(12) United States Patent
Kelly, Jr. et al.

(10) Patent No.: US 6,635,892 B2
(45) Date of Patent: Oct. 21, 2003

(54) COMPACT INTEGRATED INFRARED SCENE PROJECTOR

(75) Inventors: Thomas Hayes Kelly, Jr., Madison, AL (US); Larry Calvin Nunley, Madison, AL (US); Gianluigi Mucci, Anderson, AL (US); James Brian Rector, Harvest, AL (US); Timothy Michael Sears, Huntsville, AL (US); Glen Alan Dace, Huntsville, AL (US)

(73) Assignee: PEI Electronics, Inc., Huntsville, AL (US)

(*) Notice: Subject to any disclaimer, the term of this patent is extended or adjusted under 35 U.S.C. 154(b) by 0 days.

(21) Appl. No.: 10/085,506

(22) Filed: Feb. 28, 2002

(65) Prior Publication Data

US 2003/0164461 A1 Sep. 4, 2003

Related U.S. Application Data

(60) Provisional application No. 60/351,566, filed on Jan. 24, 2002.

(51) Int. Cl.[7] .............................. G21G 4/00; G01J 1/00
(52) U.S. Cl. .............................. 250/493.1; 250/495.1; 250/504 R
(58) Field of Search .................. 250/493.1, 495.1, 250/504 R

(56) References Cited

U.S. PATENT DOCUMENTS

| | | | |
|---|---|---|---|
| 3,742,238 A | | 6/1973 | Hoffman, II ................ 250/347 |
| 4,862,002 A | * | 8/1989 | Wang et al. ................ 250/332 |
| 5,012,112 A | * | 4/1991 | Flint et al. ................ 250/334 |
| 5,453,618 A | * | 9/1995 | Sutton et al. ............... 250/332 |
| RE37,146 E | * | 4/2001 | Cole et al. ................ 250/495.1 |

OTHER PUBLICATIONS

Review of Infrared Scene Projector Technology–1993 Ronald G. Driggers, Kenneth J. Barnard, E.E. Burroughs, Jr., Raymond G. Deep, and Owen M. Williams 1994 one page.

* cited by examiner

Primary Examiner—Bruce Anderson
(74) Attorney, Agent, or Firm—Russell Carter Gache; Sirote & Permutt, PC

(57) ABSTRACT

A small and compact infrared scene projector allows for projection of infrared images from a variety of sources. The unit utilizes an external power supply to reduce the weight of the unit and has several input pathways such as an integrated RS-232 serial port and a video port for receiving RS-170 formatted video signals. The projector uses a digital signal processor to control its internal electronics and for on-board generation of pre-programmed infrared images. A processor electronics card and a scene generator electronics card communicate internally to generate images and to control a thermoelectric cooling device mounted to a semiconductor infrared emitter array to project flicker free, high resolution infrared images. Optics in the form of an interchangeable lens or a mirrored collimator allow for projection of a generated image onto a test object. Internal high speed memory and electrically erasable firmware, both externally programmable, allow for on-the-fly programming and self-sustaining and continued operation after disconnection from a separate programming computer. An external, user programmable interface allows for the download of commands and images into the scene projector. Once programmed by an external computer, such as a personal notebook computer, the scene projector can be placed in the field for live, self test of military electronics that rely on infrared sensors to make decisions.

48 Claims, 10 Drawing Sheets

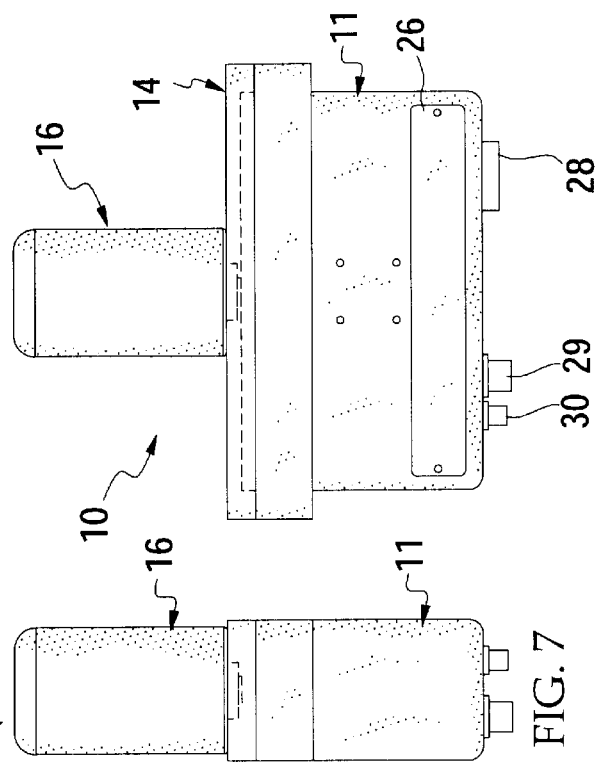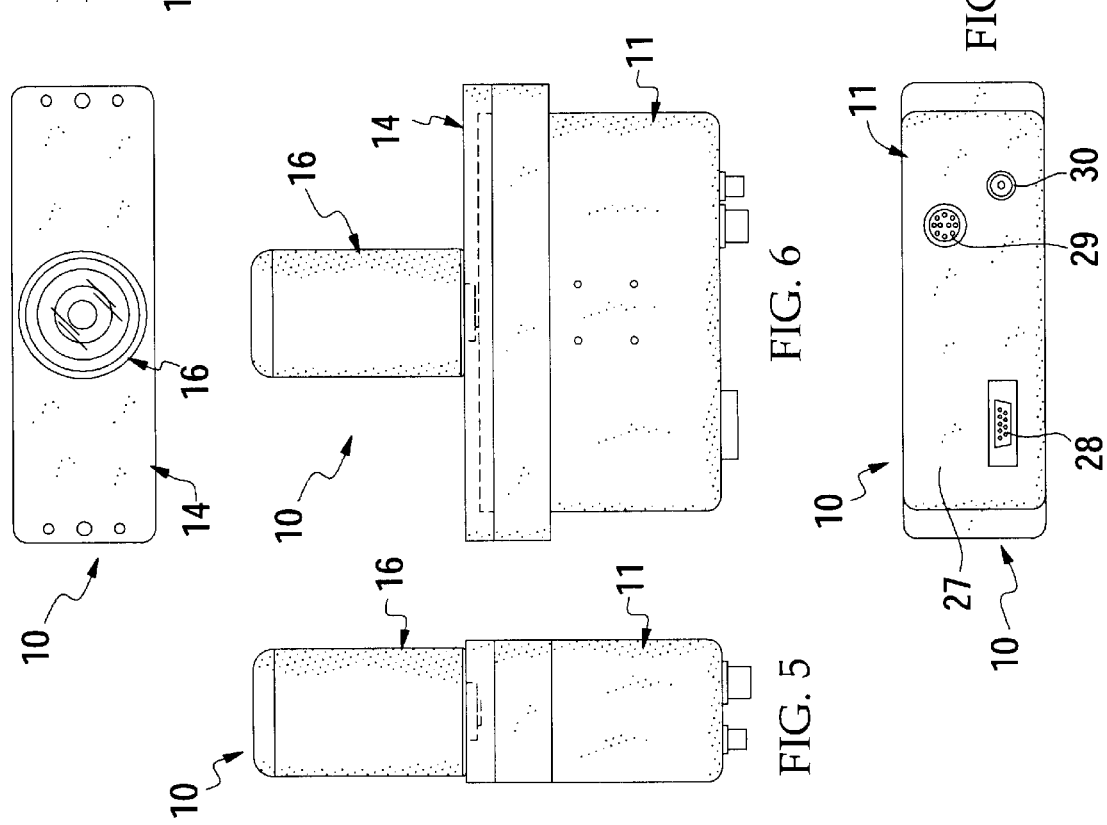

COMPACT INTEGRATED INFRARED SCENE PROJECTOR

This application claims the benefit of filing priority under 35 U.S.C. §119 and 37 C.F.R. §1.78 of the co-pending U.S. Provisional Application Ser. No. 60/351,566 filed Jan. 24, 2002, for a COMPACT INTEGRATED INFRARED IMAGE SCENE PROJECTOR. All information disclosed in that prior pending provisional application is incorporated herein by reference.

FIELD OF THE INVENTION

The present invention relates generally to image projectors. In particular, the present invention relates to military type image scene projectors. In greater particularity, the present invention relates infrared image scene projectors.

BACKGROUND OF THE INVENTION

A good deal of military and communications weaponry today relies upon infrared imaging and acquisition techniques. For example, missile targeting systems rely upon templated infrared signatures to lock onto aircraft exhaust signatures, helicopter gun ships use tank heat signatures to lock onto targeted vehicles, and military aircraft navigation aids use infrared sensors to assist in auto-navigating through rough terrain and inclement weather. In more complex systems, such as satellite imaging, navigation element tracking, and forward looking infrared (FLIR) navigation systems, recorded infrared scenes are compared to live sensory data for real-time decision making. In general, infrared image sensing signatures of geography, buildings, and even people will likely become a major component in target acquisition and locking systems; and it is expected that various sorts of weaponry—missiles, artillery, navigation, and rifle targeting systems—will utilize infrared imaging in some form or fashion in the future.

Infrared image sensors detect electromagnetic radiation from a scene and output electrical or optical information extracted from the scene. Lenses associated with a selected imaging system focus infrared radiation upon one or more sensors so that acceptable signal capture is obtained. However, while image detection has been advanced due to improvements in infrared focal plane arrays (FPAs) and advanced optics design, a great deal of attention is now being drawn to the design of software for image recognition and decision making based upon received images. Sophisticated software analyzes received images and makes logical determinations based upon pre-established criteria, such as object templates, spectrum signatures (e.g. frequency signatures), and intensity to analysis.

Testing of infrared imaging systems can be as complex as the imaging design itself. Most production testing methods inject an electrical test signal for a sensor system to process and compare system component responses based upon an expected result. However, signal injection is not an optimum test method because the image detector with its related electronics and associated gimbals and optics are not tested. The optics and detector of the system are usually tested separately using a very simple static scene or test pattern, or with a very slow moving, but somewhat more complex series of synthetic scenes. This two-part test methodology does not perform an end-to-end test of the entire system and is inferior to providing live scene image testing data. Hence, as the quantity and complexity of such systems has increased the need for generating and projecting synthetic images for input into image sensors has also grown.

Several systems are now available capable of presenting realistic, detailed infrared images or "scenes" into the field of view of the sensors being tested for a selected system. For example, Kenyon U.S. Pat. No. 6,123,288, has developed a system to provide flicker-less projection of infrared scenes using a non-volatile electron beam addressed light-valve output. Leddy, U.S. Pat. No. 5,457,493, has developed a micro-mirror based image simulation system in which a digital micro-mirror reflects infrared energy from a separate infrared source onto a testing subject. And, Billingsley, U.S. Pat. No. 4,530,010, has designed a dynamic infrared scene projector using thin films of vanadium dioxide which are excited to produce infrared images.

However, each of these designs and others currently available in the industry suffer from several drawbacks, namely: (1) none of the currently available systems allow for easy mobile transport of a scene generator; (2) none allow for solid state generation of scene images on location and at reduced atmospheric pressures; and (3) none provide a self-contained, compact design that is capable of self-generation of images without external stimulus. Hence, military systems utilizing infrared sensory electronics cannot be easily tested in the field and do not include the ability for continuous live testing in airborne vehicles.

Moreover, one of the most desired testing methods for testing defense armaments and navigation systems is "built-in-self test (BIT). However, BIT is most useful if the testing hardware can be utilized in the field in the typical environment of the system. For example, if a scene projector could be integrated into a FLIR system, live pre-flight or in flight testing could be accomplished to ensure the integrity of the system's operation. BIT could also allow relatively easy refinements to existing imaging systems and allow the enhancement of on-board software recognition systems, thereby increasing the effectiveness of the current infrared sensory electronics.

Therefore, what is needed is a compact, self-contained infrared scene projector that can be configured to test infrared imaging systems in the field and during live operations.

SUMMARY OF THE INVENTION

It is the object of the present invention to provide a solid state, self-contained infrared scene projector.

It is another object of the present invention to provide an infrared scene projector that can internally create infrared scene images for projection onto a target testing object.

It is still another object of the current invention to provide an infrared scene projector that can receive image commands from an external computer for projection.

It is yet another object of the current invention to provide an infrared scene projector that can receive external video source imagery and project such source imagery.

It is still another object of the current invention to provide an infrared scene projector that can provide internal cooling for an infrared pixel array and thereby properly regulate infrared background temperatures of projected solid objects.

It is still another object of the current invention to provide an infrared scene projector that allows for interchangeable optics.

It is still another object of the current invention to provide an infrared scene projector that can be integrated with a mirrored collimator for multi-spectral projection of scene imagery.

In summary, the present invention is a relatively small and compact infrared scene projector. An external power supply powers the projector unit and an integrated RS-232 serial port on the projector allows for reception of commands from a connected personal computer. The projector utilizes a digital signal processor to control the internal electronics and for generation of preprogrammed infrared objects. A processor assembly card and a scene projector assembly card communicate internally to control a thermoelectric cooling (TEC) device and an electronic infrared projector array to project flicker free, high resolution infrared images onto a targeted sensor for testing. Optics in the form of interchangeable lens or a mirrored collimator allow for projection of an array generated image onto a live test object. Internal high speed memory and electrically erasable firmware, both externally programmable, allow for on-the-fly programming and self-contained operation. The projector can be co-located with military electronics that utilize infrared sensory imagery to provide field located built in self test (BIT).

Other features and objects and advantages of the present invention will become apparent from a reading of the following description as well as a study of the appended drawings.

BRIEF DESCRIPTION OF THE DRAWINGS

A scene projector incorporating the features of the invention is depicted in the attached drawings which form a portion of the disclosure and wherein:

FIG. 4 is a front elevational view of the assembled scene projector;

FIG. 5 is a side elevational view of the left side of FIG. 6;

FIG. 6 is a plan view of the top of the scene projector;

FIG. 7 is a side elevational view of the right side of FIG. 6;

FIG. 8 is a plan view of the bottom of the assembled scene projector;

FIG. 9 is an end view of the assembled scene projector;

DESCRIPTION OF THE PREFERRED EMBODIMENTS

Figure 1:
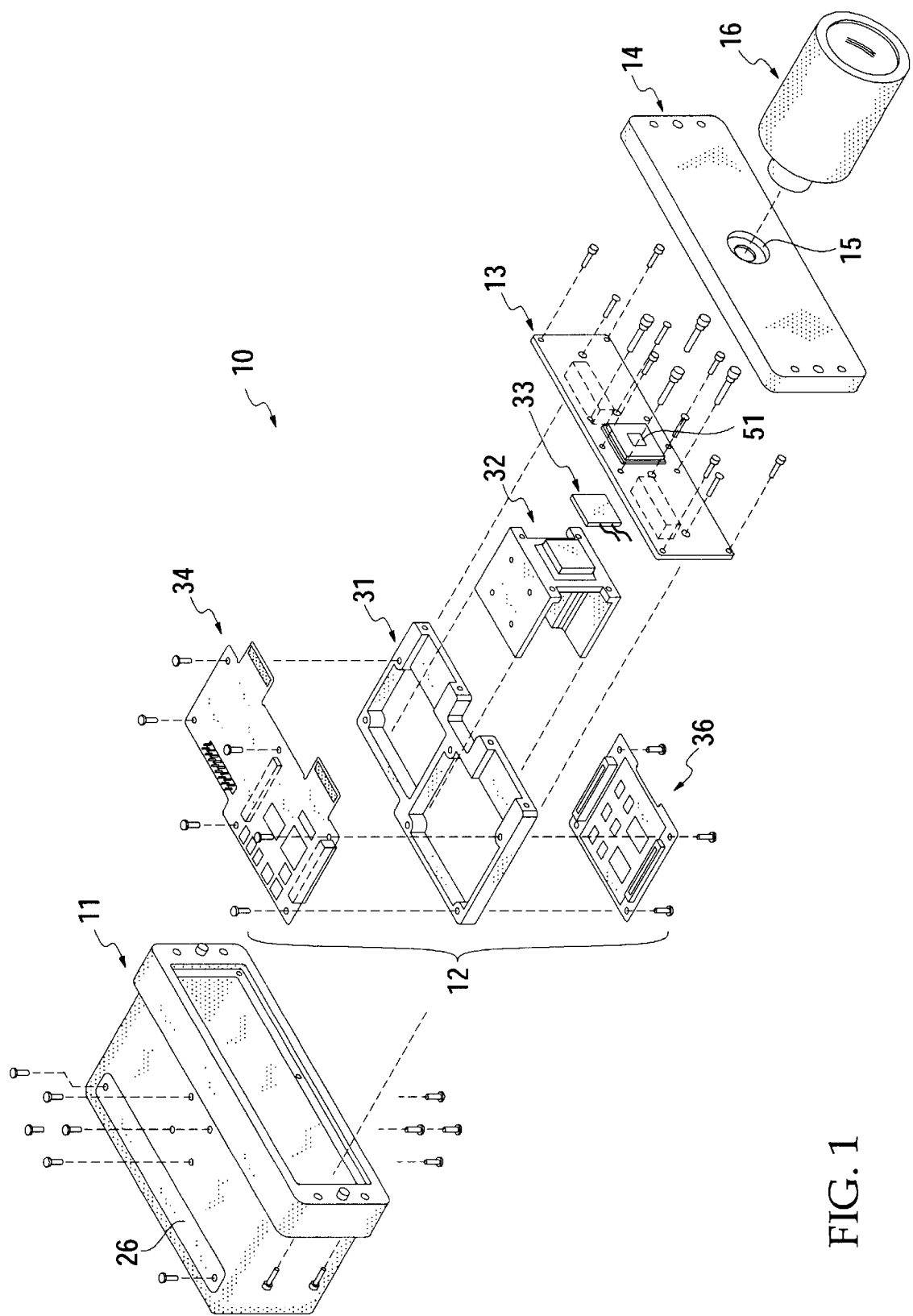
FIG. 1 is an exploded perspective view of the bottom side (access panel side) of scene projector showing the primary physical components of the system.
Figure 2:
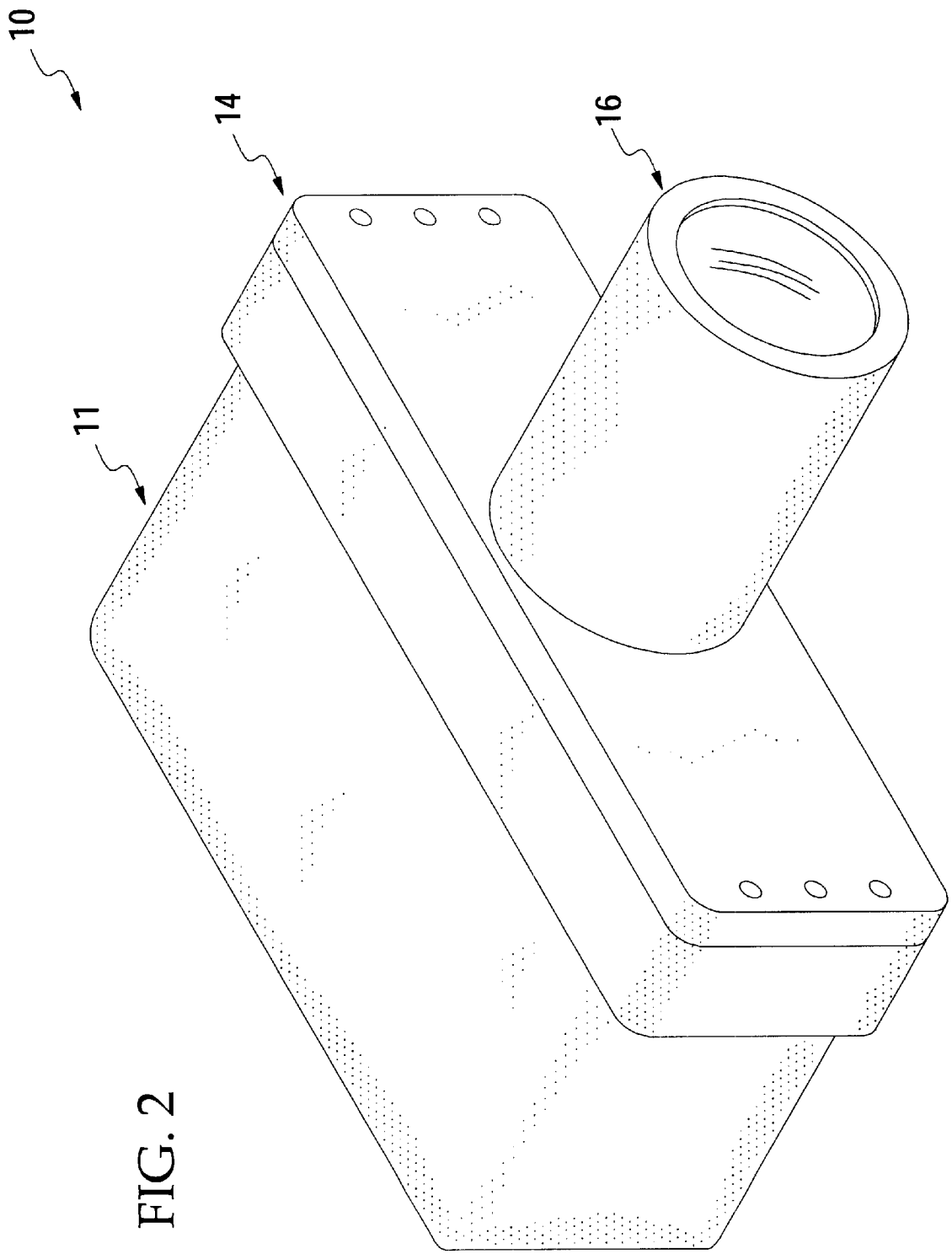
FIG. 2 is a front perspective view of an assembled scene projector.

Referring to the drawings for a better understanding of the function and structure of the invention, FIG. 1 shows an exploded view of the primary components of one embodiment of the infrared scene projector 10. A primary housing or case 11 acts as a protective enclosure and support for the primary electronics assembly 12 which is mated to an infrared array assembly 13. As shown in the Figure, screws affix the combined electronics assembly 12 and infrared array assembly 13 into housing 11 along an outer circumferential margin of the array assembly board 13 seated on an inner circumferential flange of the housing 11. A lens mounting plate 14 is aligned onto dowels extending forward from the primary housing 11 with additional screws securing the plate 14 against the housing as shown, enclosing the electronics assembly 12 and the array assembly 13 within the housing 11. Aperture 15 is located at the center of the lens mounting plate 14 to allow passage of the infrared emissions emanating from the seated infrared emitter array. The aperture 15 also serves as a receptor for lens assembly 16 which includes a threaded or smooth extension from its body for mounting onto the plate 14. As shown in FIG. 2, the to assembled scene projector 10 occupies a rather compact and unobtrusive shape, having a typical thickness of approximately 3 inches and a total length measured from the foremost point on the lens assembly to the rearmost portion of the housing of only about 8 inches.

Figure 3A:
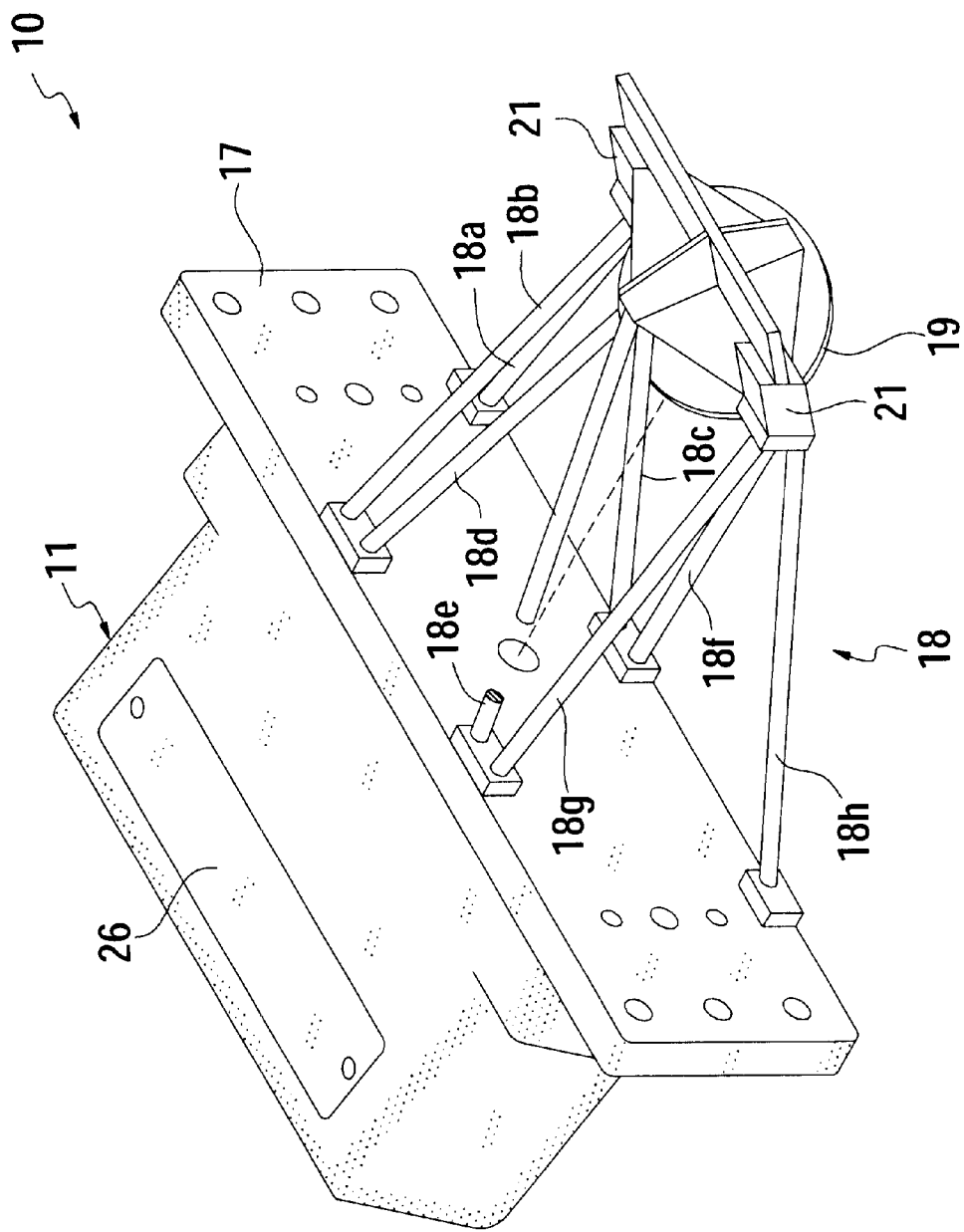
FIG. 3a is a perspective view of another embodiment of the assembled scene projector showing an attached tower and reflective fold mirror assembly in place of an optical lens.
Figure 3B:
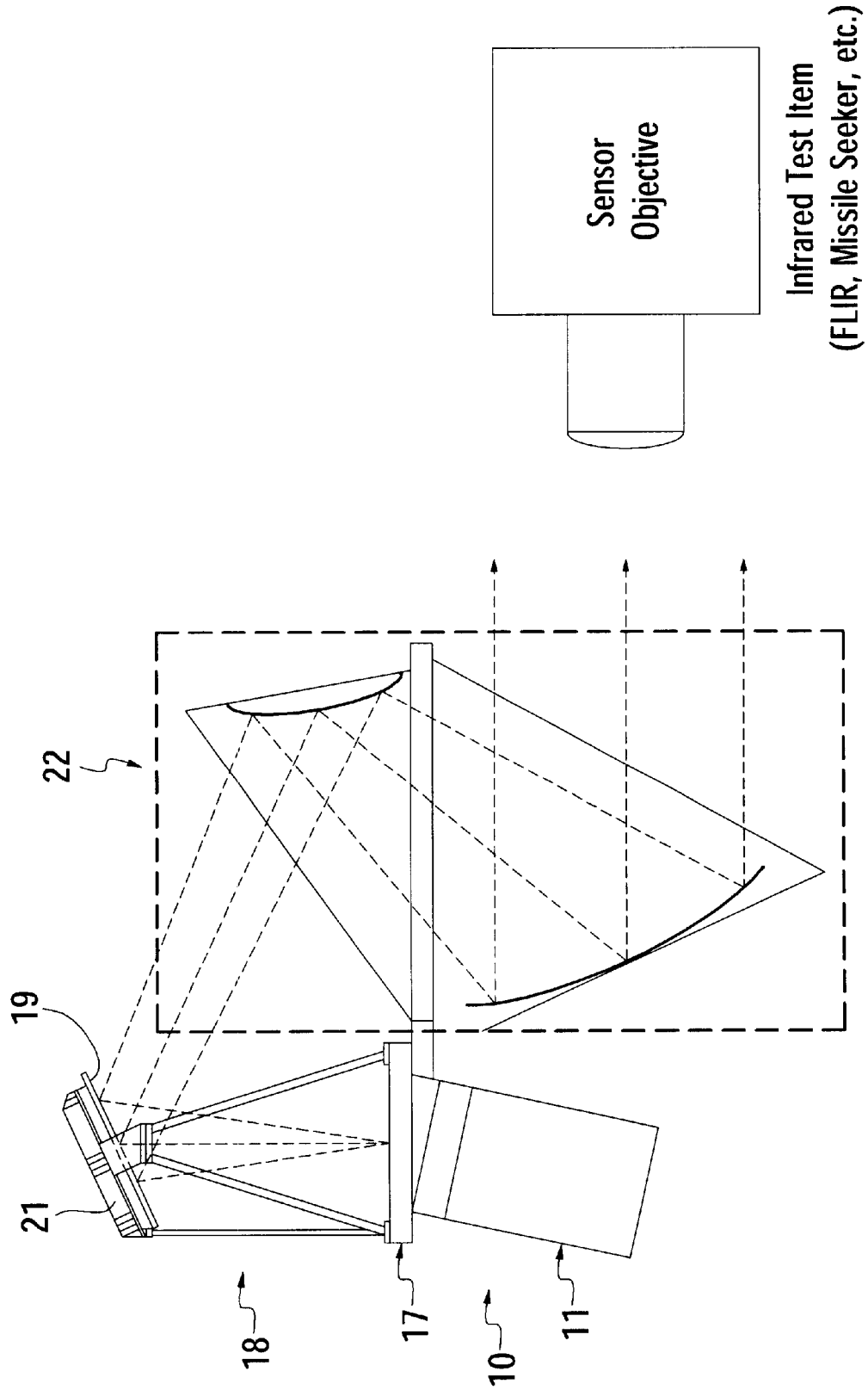
FIG. 3b is a diagrammatic view of the scene projector including the tower and reflective fold mirror with an adjacent collimator.

FIGS. 3a–b shows another embodiment of the scene projector 10 in which the enclosed electronics (12, 13) and housing components (11) are outfitted with a tower and fold mirror in lieu of a refractive lens assembly 14, 16, and placed adjacent to a collimator assembly. In certain applications it is advantageous that the scene-projector 10 be positioned in front of a large aperture enclosed within a weather resistant housing. In such applications, a fold mirror and collimator assembly allows for testing structures to be positioned within an aircraft or vehicle for the purposes of mission readiness and target acquisition refinements. As shown in FIG. 3a, an angled collimator mounting plate 17 supports a tower assembly 18 of multiple leg extensions 18a–h, and a fold mirror 19 is held by a suitable bracket 21 that allows for positioning of the mirror in an angle for reflecting a projected infrared image into an adjacent collimator. As shown in FIG. 3b, a typical collimator assembly 22 might include, two curved mirrors, one convex and one concave, both suitably shaped to focus a projected infrared image onto a proximally located infrared sensor objective. As will be understood in the industry, various types of collimator lens and shapes can be manufactured to address various types of targeting sensor sizes and other physical configurations of infrared sensor electronics. It will also be noticed that the collimator mounting plate 17 is angled at approximately 12.32°. However offset angles of various ranges are anticipated to address various types of collimator and fold mirror configurations and sizes. The figure shows a Ritchey-Chretien type of collimator, although various configurations and types will be utilized. In the shown example configuration, both mirror surfaces are off-axis aspheric sections with an 8-inch clear aperture having a 36-inch focal length. An interface plate engages alignment pins to allow for positioning of the infrared array at the tilted image plane of the collimator.

FIGS. 4–9 show different elevational views of the refractive lens embodiment of the infrared projector 10. FIG. 8 additionally shows an access plate 26 that allows for access to the internal wiring harness (not shown) connecting the internal electronics assembly boards to the projector's external port connectors. FIG. 9 shows external connectors, namely, a standard RS-232 9 pin serial port connector 28, a 10 pin recessed pin grid connector 29 which provides power and grounding for the projector, and a video input jack 30 that provides a port for receiving RS-170 video signals.

Figure 10:
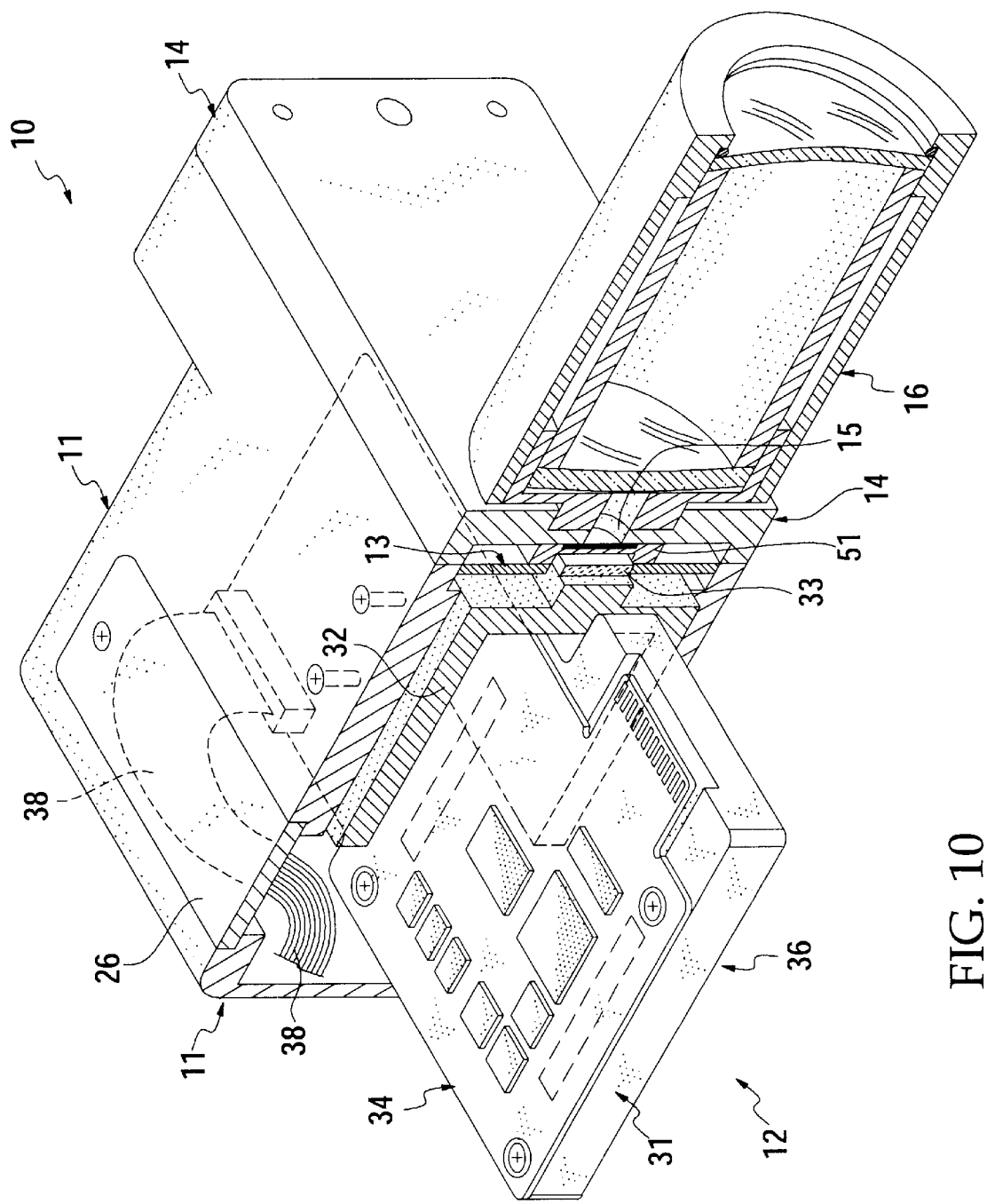
FIG. 10 is a perspective cutaway view of the assembled scene projector showing the relative positions of the projector's housing, the DSP CCA, the Scene Projector CCA, a passive heat sink and TEC cooling device, the array CCA, and the optical subassembly.

FIG. 10 shows a perspective cut away view of the assembled scene projector showing relative positions of various critical components for the scene projector 10. The projector housing 11 holds the passive heat sink 32 via screws protruding through each heat sink cooling fin, allowing for isolation of the heat conducted away from the array emitter 51 from the primary electronics assembly 12. Bracket 31 holding electronic assemblies 34 and 36 (not visible) is secured into array emitter CCA 13 with 4 screws extending through the emitter CCA 13 and into the bracket 31. The assemblies 34 and 36 are secured to the bracket with flat pan screws. A TEC (Thermoelectric Cooler) device 33 is positioned between heat sink 32 and infrared array assembly board 13 and affixed to a flat portion of the heat sink 32 with thermally conducting pads and to the bottom of the actual array emitter. As can be seen in the figure, connectors are suitably positioned to engage each of the boards electronic internal connectors and provide for electrical communications between the boards over prescribed lines. A rectangular aperture in the printed circuit board holding the infrared array emitter 51 allows the TEC cooling device to be mounted directly onto the ventral surface of the ceramic semiconductor package of the emitter array 51, which is affixed thereto with suitable heat conducting pads. The heat sink 32 is also adhesively affixed to the heat transference side of the TEC to promote transfer heat emissions generated by the infrared emitter away from the emitter and against the inner surface of the housing 11 Heat is therefore conducted away from the emitter 51 and the primary electronic assembly 12 through the housing 11 top and bottom surfaces. As those skilled in the art will appreciate, establishing proper controls for background infrared emissions is an important component in proper infrared scene generation. The disclosed arrangement of the TEC cooler and suitably sized heat sink allows for sufficient dissipation of heat energy from the infrared array emitter such that, under proper electrical control as will be discussed, background energy emissions are controlled.

Thermoelectric cooling devices such as the TEC cooler disclosed herein 33 are primarily electric heat pumps used for the removal of heat from one side of a TEC device to another side. Each side is sometimes referred to as the hot and cold sides of the TEC device. In the disclosed embodiment, the cold or cooling side of the TEC device is affixed to the rear or underside portion of the infrared emitter array and the hot or heat dissipation side is located on a side opposite from the cooling side and against a forward-most, flat portion of the passive heat sink 32. A suitable TEC cooler utilized in the disclosed design is a FRIGICHIP FC series type available from Melcor, Inc. The passive heat sink 32 is made from suitably conductive metal alloys such as conductive aluminum which satisfactorily dissipates heat transferred by the TEC cooler. As infrared emitter technology advances, it is anticipated that a passive heat sink design may, in and of itself, provide sufficient cooling, thereby obviating the need for thermoelectric cooling.

The infrared array emitter 51 can be comprised of any industry standard matrix addressable infrared emitter (albeit with some electronics reconfiguration for each model). The current preferred embodiment utilizes analog generated input signals to address image pixel intensity requirements, although the inventors contemplate that a purely digital based infrared emitter will be available in the future. A suitable emitter for the current design is offered by Honeywell, Inc. under the brand name Brite 128-512 Infrared Emitters. These types of emitters directly radiate energy from underlying pixel addressable points on a silicon wafer. A matrix of 128×128 pixels form a matrix of gray body emitters with an infrared radiance that varies as a function of an applied voltage. These types of Honeywell emitters generate infrared radiance at individual pixel locations by passing current through a thin film resistor suspended above a polarized substrate. The current through the emitter resistor is a function of the gate voltage stored in the hold capacitor connected to the gate allowing for very low power operation by which pixel emissions vary within a wide dynamic range. Moreover, these types of infrared emitters have high vacuum integrity because the pixels are fabricated using low vapor pressure materials, such as nitride and oxides, with bulk properties having melting temperatures in the 1500–2000 k temperature range. Hence, each pixel emits a high contrast infrared point with very high thermal stability that performs over a range of atmospheric pressures, such as may be experienced in airborne applications.

As partially shown in FIG. 10, connectors on the infrared emitter array assembly board 13 provide for electrical signal connections between various electronic assembly boards, and wiring harness 38 provides electrical signal connectivity from external connectors 28–30 to the various boards.

Figure 11:
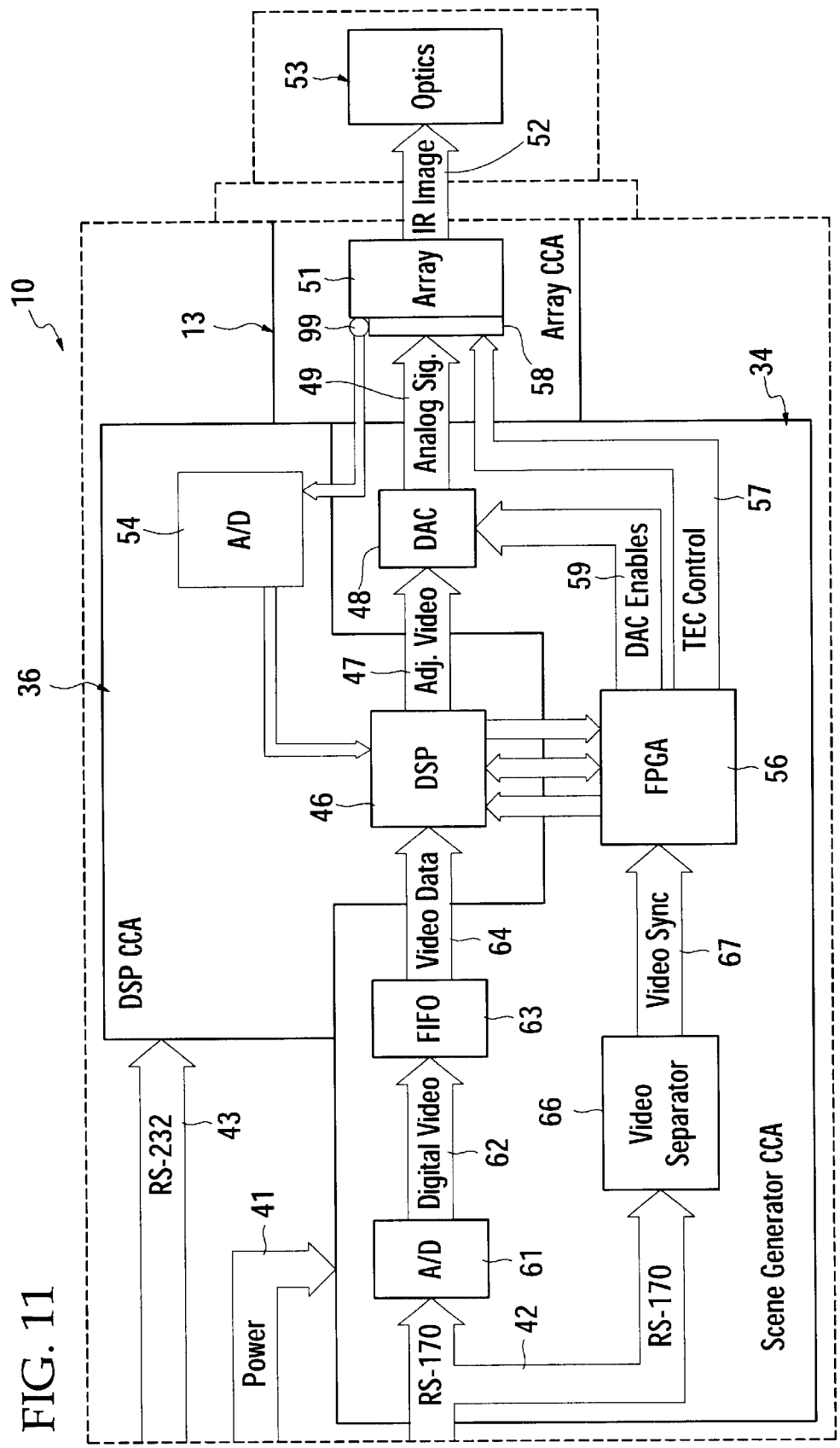
FIG. 11 is a functional system diagram showing the primary functional subsystems of the scene projector and their inter-communication data paths.

Referring now to FIG. 11, the system consists of four functional components: (1) a DSP circuit card assembly ("CCA") 36; (2) a scene generator circuit card assembly 34; (3) an infrared emitter array CCA 13; and, (4) an optical assembly 53. The scene generator CCA 34 provides power 41 to other functional elements in the system. A RS-232 port 43 provides serial information input into the DSP CCA 36 to receive computer commands from a graphical user interface running on a separate personal computer (not shown) and also provides for reprogramming of internal firmware and downloading of DSP operational commands. A connector 30 (see FIG. 9) allows for RS-170 signals 42 to be received by the scene generator CCA 34, which are then separated into digital video data 64 and video synchronization information 67. A digital signal processor or "DSP" integrated semiconductor 46 provides video data 47 for conversion through a digital analog converter 48 into analog signals 49 received by infrared emitter array 51 for infrared image generation 52. The DSP 46 provides direct video feed from the RS-170 signal into the digital analog converter 48 or, alternatively, the DSP can generate its own infrared images through algorithm computations stored in FLASH memory and in association with logic stored in firmware FPGA 56 (Field Programmable Gate Array). Also, an RS-232 source 43 can provide a bit mapped scene image to be held in high speed memory on the DSP CCA 36 such that it can then be transferred directly to the infrared image emitter array 51. A TEC cooler 58 provides cooling to the array emitter 51 as already discussed and thermistor 99 outputs a feedback signal to analog digital converter 54 that is read by DSP integrated circuit 46. In response, the DSP outputs commands through the FPGA interface 56 to control the TEC cooling rate through TEC control signals 57.

Figure 12:
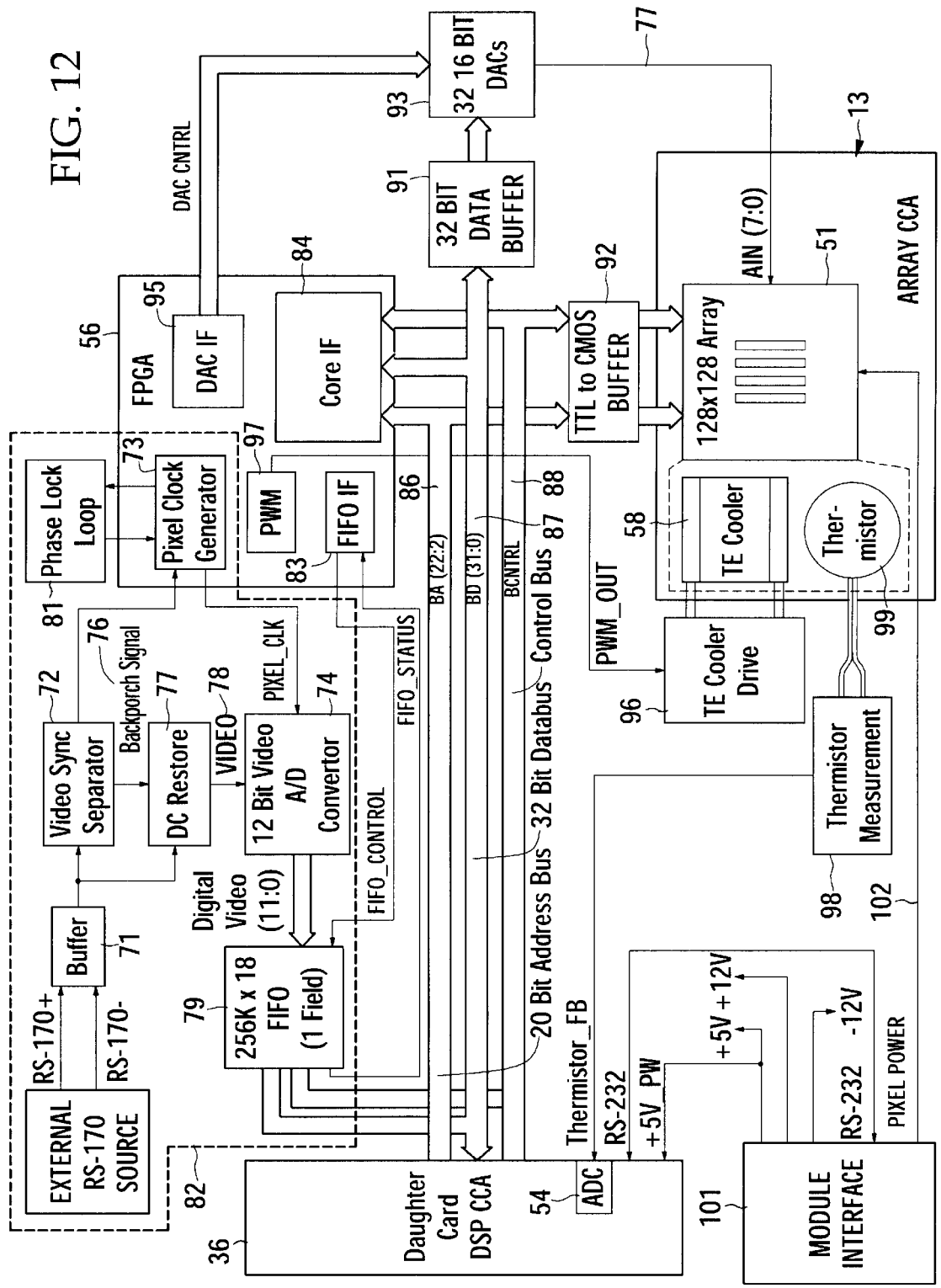
FIG. 12 is a system component diagram showing functional communication paths between the primary electrical elements of the scene projector CCA.

FIG. 12 shows more specific details regarding the function and operation of individual components located on the scene generator CCA 34. A buffer 71 normalizes voltages compatible with the CCA's voltage levels from the inputted RS-170 signal 42, and a video sink separator 72 separates the video synchronization signal from the RS-170 buffered signal to establish a timing indicator signal for use by pixel clock generator 73. The pixel clock generator includes logic to send appropriate clock signals via a pixel clock input line to a 12-bit analog to digital converter 74. "Backporch" signal 76 from separator 72 is used to offset-normalize the video information 78 via DC restorer 77 to allow for proper digital conversion. Video information 78 is then converted from analog to digital via 12-bit video analog to digital converter 74 and saved in a 256K×18 FIFO 79 memory for interim storage of individual interlaced signal fields. The pixel clock generator 73 generates a field storage signal at approximately a 60 Hz rate so that interlaced fields can be combined into a non-interlaced frame by the DSP CCA 36. The pixel clock generator 73 utilizes external phase loop logic 81 in conjunction with the pixel clock generator logic 73 contained within the FPGA 56 to produce the appropriate clock signals. The combination of these video and logic elements 82 allows for the continual conversion of RS-170 source signals, either in color or black and white, to be continually digitized and processed by the DSP CCA 36. As will be explained in more detail, the DSP CCA 36 has available one field of video stored in the FIFO 79 for processing in accordance with prior downloaded instructions from a separate user software package or prior loaded internal processing instructions. Due to the speed of the DSP processor, processing of individual video fields stored in the FIFO 79 occurs well prior to the availability of the next interlaced video field presented by the external RS-170 signal source, thereby permitting the combining of interlaced fields into a non-interlaced image and the timely transference of the image to the emitter array 51.

FIFO interface 83 provides a signal to the DSP CCA 36 signaling whether or not the FIFO 79 contains a complete field and is available for transference to the DSP CCA. FIFO interface 83 also sends control signals to the FIFO 79 instructing the FIFO to load digital video from the 12-bit video analog-to-digital converter 74. Core interface logic 84 provides interface logic to accept control signals from the DSP CCA 36 via multiplexed buses 86–88. Bus lines 86–88 are physically identical on the scene generator CCA 34 and on the DSP CCA 36. However, the digital signal processor 46 utilizes chip selects to multiplex values on the bus 86–88 to present data and receive data from appropriate integrated circuits such as, for example, the FIFO video frame information 79 and transference of core logic instructions to core interface 84 on FPGA 56. Bus 86–88 is utilized to transfer 32 bit data information to data buffer 91 and matrix addressing array buffer 92. FPGA 56 also includes digital to analog conversion interface logic 95 that provides control signals to the 32 bit digital analog converter 93. Those skilled in the art will understand, therefore, that the 20 bit address bus, the 32 bit data bus, and the control bus 86–88 are a multiplex set of lines circumscribing paths on both the scene generator CCA 34 and the DSP CCA 36. By using a chip select function, the DSP CCA 36 can receive interlaced video field data from FIFO 79 and combine it with a second interlaced field to produce a non-interlaced display image frame for writing to the 32 16-bit DAC 93 in preparation for display.

A 32-bit data buffer 91 is used for signal fan out to the 32 16-bit DACs 93. Pixel intensity information is retained in the 32 16-bit DAC 93 and presented to the infrared emitter array 51 via eight analog input lines 77. These analog input values are held and the DSP CCA 36 energizes the appropriate address lines. A TTL-to-CMOS buffer 92 is used to convert the DSP CCA 36 3.3V TTL logic levels to 5V CMOS logic required by the infrared emitter array 51.

Additional address strobes are replicated until all of the pixels in the array 51 have been loaded with analog intensity information. Although a 128×128 pixel configuration is shown, those skilled in the art will understand that a scalable addressing scheme may be utilized to address larger arrays such as a 256×256 or 512×512 pixel arrays.

The TEC cooler 58 is mounted to the underside of the array 51 to provide cooling as previously discussed. A TEC cooler drive 96 receives constant frequency signal from a pulse width modulator 97 which varies its duty cycle in accordance with modulation logic in the FPGA 56 to control the rate of cooling by the TEC cooler 58, and which in turn is controlled by command signals provided by the DSP CCA 36 through the core interface logic 84. A thermistor measurement circuit 98 receives sensory information from a temperature sensitive thermistor 99 which is then converted into digital information through analog to digital converter 54 on the DSP CCA 36. Digital signal processor 46 then interprets digital values of the thermistor measurement circuit 98 and sends appropriate control signals to the FPGA 56 to control the modulator 97. Hence, through this feedback communication strategy, the TEC cooler 58 can be controlled with a high level of granularity that allows for control of the background infrared emissions of the infrared emitter array 51, thereby enhancing infrared image generation integrity.

Module interface 101 comprises an external connector 29 and wiring harness (not shown) providing appropriate +5V, +12V, and −12V input voltages and returns. The module interface 101 also comprises the RS-232 pin connector 28 that allows for direct connection into the DSP CCA 36. In order to minimize feedback noise potential, a separate pixel power line 102 provides +5V direct input and return into the infrared emitter array 51. If common +5V lines were utilized to power the infrared emitter array 51, a possibility of switching noise generated by the DSP CCA 36 could be propagated through power lines into the array CCA 13 and provide undesirable interference with the infrared emitter's operation.

Figure 13:
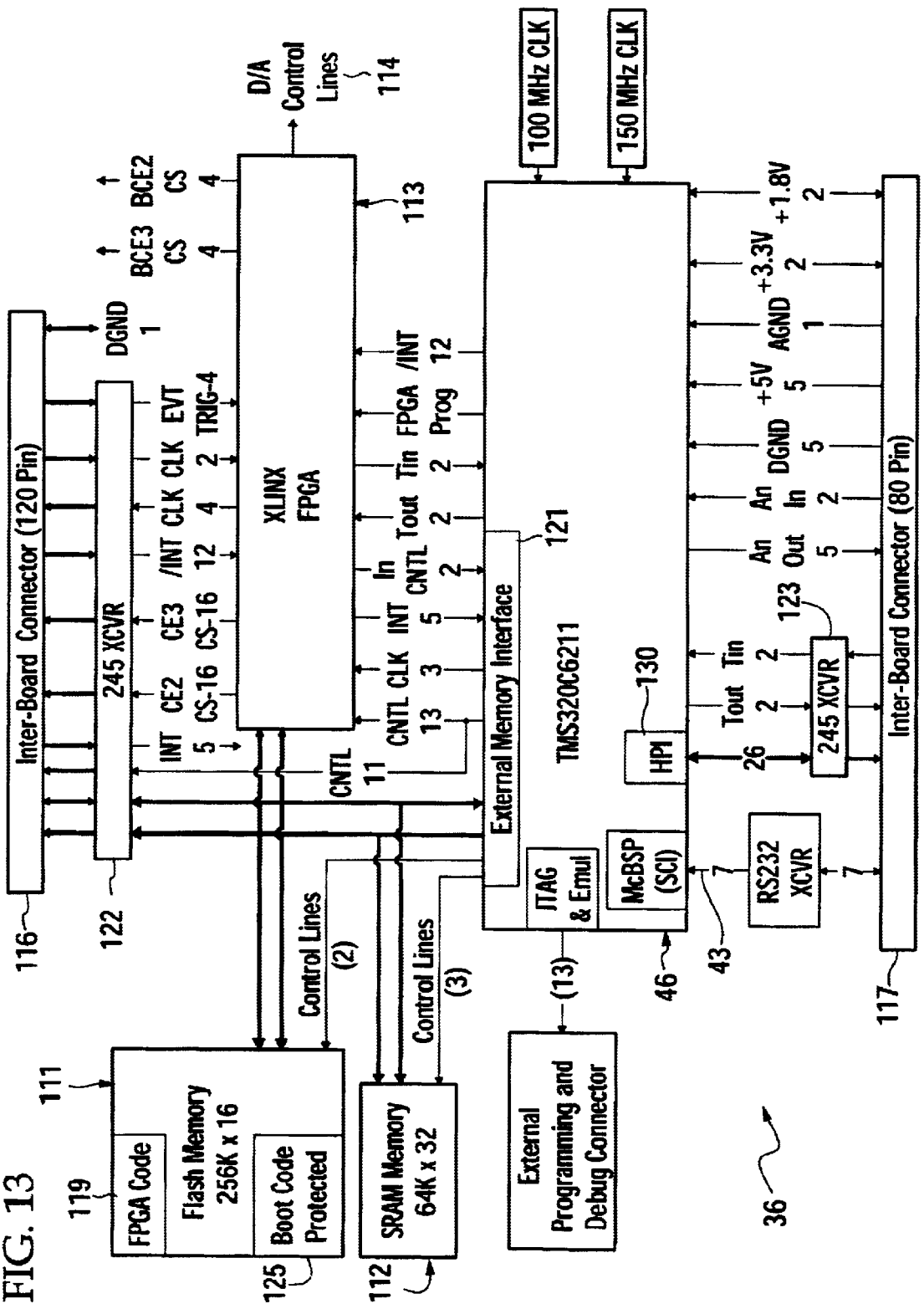
FIG. 13 is a system component diagram showing functional communication paths between the primary electrical elements of the DSP CCA; and, FIG. 14 is an optical element diagram of the optical subassembly used in the scene projector.

Referring now to FIG. 13 for a better understanding of the operation of the DSP CCA 36, a TMS320C6211 digital signal processor 46 provides the primary processing functions of the DSP CCA 36. Texas Instruments is the manufacturer of the TMS320 series of digital processors two of which, the TMS320C62211 (non-floating point) and the TMS320C6711 (floating point) digital signal processors, may be utilized in the instant described design. However, those skilled in the art will understand that any type of processor having the capability of executing instructions and algorithmic processes at sufficient speeds may be utilized. For example, the inventors anticipate that a general purpose microprocessor such as Intel's 386 16-bit line of microprocessors could be utilized in place of herein described digital signal processor. The DSP CCA 36 is a fairly self-contained CCA and may be utilized in various other systems. The actual DSP operates at 150 MHz and uses an internal 100 MHz system bus, and the speed of the DSP CCA 36 is approximately 1200 MIPS or 600 MFLOPS. The DSP CCA includes 256K×16 bit FLASH memory 111 and 64K×32 bit asynchronous static memory (ASRAM) 112 for DSP program store and image calculations. The CCA 36 also utilizes several high speed and low speed (100 MSPS, 100 KSPS) analog to digital converters (not shown) controlled by a XLINX FPGA through control lines 114.

The procedures by which the TMS320DSP, or an alternative microprocessor, are programmed will not be discussed in as much as programming kits and code compilers are readily available and well understood in the industry. For example, Texas Instruments offers a software developer's kit called a "Code Composer Studio Development Environment" for the TMS320 line of DSPs and Intel sells similar developer kits for its line of microprocessors allowing for DSP code assembly and compilation.

The DSP 46 communicates to the scene generator CCA 34 via external memory interface EMIF 121 and via connectors 116 and 117. Other communication links such as the RS-232 link 43, a controlled area network link (not shown), and a host port interface (HPI) 130 can also be invoked for other types of communication and controls. Currently the EMIF is a little endian format, but other suitable formats may be utilized. Flash memory 111 includes FPGA reprogramming code 119 to allow for reprogramming of the XLINX FPGA 113 and includes a protective portion of flash memory for boot up code 125. The DSP 46 and the XLINX FPGA 113 communicate with the scene generator CCA 34 through the external memory interface 121. The DSP 46 utilizes four external address spaces in its external memory interface 121, namely; CE0, CE1, CE2, and CE3. CE0 is used to access static RAM 112 and CE1 is used to access FLASH memory 111, registers on a separate PLD (not shown), and registers on the XLINX FPGA 113. The XLINX FPGA 113 decodes each of these address spaces into four sub address spaces to allow a total of eight addressable spaces. Therefore, the XLINX FPGA may utilize one of its sub-address enables using the top two address bits (ADR21 and ADR20) from which chip enables CE2 or CE3 may be activated by the DSP 46 via the EMIF 121. The scene projector CCA 34 generally utilizes 5 of the 8 sub addresses to decode logic signals.

The XLINX FPGA 113 includes all the necessary logic to decode and control various peripherals on the DSP CCA 36. This includes the Analog to Digital Converter (ADC) 54 for receiving thermistor measurement signals 98, DSP external interrupt control registers, such as interrupt pole, mask, and status registers, and an optional fast ADC, other optional fast and slow Analog to Digital Converters (DAC), LED control registers, clock control registers, and FPGA configuration status registers.

Communications between the DSP CCA 36 and the scene generator CCA 34 occur through CE decodes over the address bus, the data bus of the EMIF, and the read/write control signals of the EMIF bus. The CE lines (see Figure) decode whether the EMIF bus lines are being utilized for communication between the DSP 46 and the scene generator FPGA 56, the DSP and the scene generator CCA digital analog converters, or the FIFO 79. Transceivers 122 and 123 insure error free communications across connectors 116 and 117 between the DSP CCA 36 and the scene generator CCA 34. Also, a separate programmable logic (PLD) device on the DSP CCA (not shown) controls the FLASH memory 111, sets the timing input for and enables reprogramming of the XLINX FPGA 113, contains XLINX FPGA 113 read back signals, and generates a 10 MHz clock for the use of an optional controlled area network controller.

Figure 14:
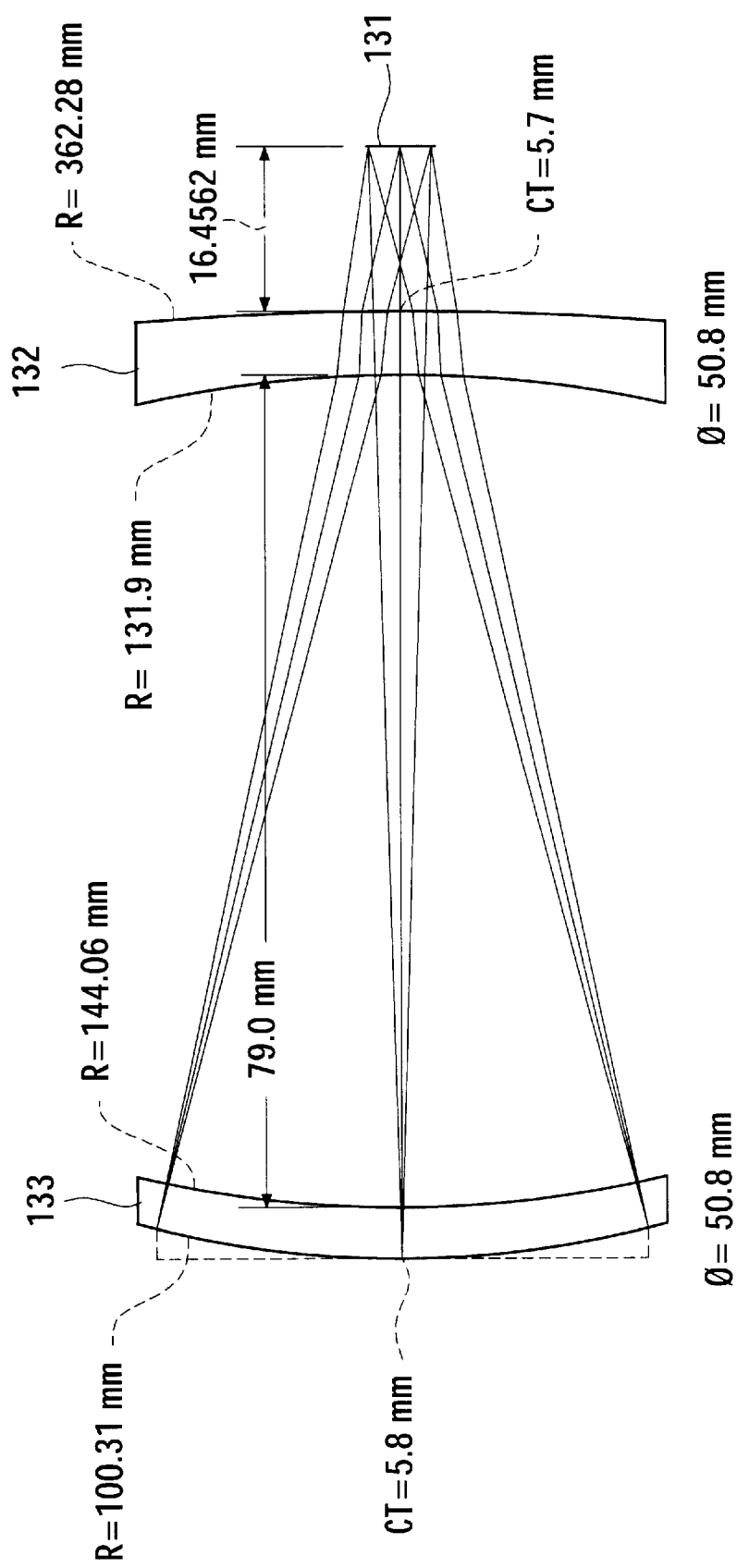

FIG. 14 shows an optical element configuration suitable for the herein described scene projector. Various types of optical assemblies and optical elements may be utilized to project an image emitted by the infrared emitter 51 onto various objectives. The shown optical assembly is optimized to project an image into a selected FLIR objective lens. It will be understood that varying optical assemblies could utilize threaded or bayonet type mounts to facilitate the interchangeability of lens on mounting plate 14 to allow for rapid reconfiguration of the infrared projector 10 to suit different situations.

Inasmuch as optical assemblies and techniques for combining various optical elements to produce suitable focal lengths and fields of view are well known and understood in the industry, a detailed description of individual optical elements will not be provided. Nonetheless, an example configuration is shown in FIG. 14 which has been used by the inventors and is suitable for the herein described types of applications. As shown, individual pixel elements of the infrared emitter array 51 emanate from plane position 131 and are refracted by zinc selenide optical element 132. Element 132 has shaped properties pursuant to the values shown and is suitable for infrared refraction. Infrared image rays strike a second germanium optical element 133 and are again refracted to project an infrared image into a test article objective. Element 133 has optical properties as shown in the Figure. A typical distance of the optical element 132 and infrared source 131 is 16.4562 mm and the distance between Element 132 and Element 133 is 79.0 mm.

In operation, the scene projector 10 can produce infrared images through three primary methods: (1) it can project a received RS-170 video signal which is refreshed at television video rates; (2) it can project a preloaded bit-map image received via the RS-232 communications link; or (3) it can construct synthetic images from parameters received from a separate user interface running on a serially connected personal computer or other computing device. Preloaded images, either through parameter description or as a bit-mapped image, can also be saved in memory (111 or 112) and projected on demand. In fact, a demonstration program using stored images or a preloaded test program can be created by storing such images or parameters and accessing them through an iterative display loop program.

Creation of synthetic objects are accomplished by transferring inputs from an operator via a host interface to the scene projector 10, and executing algorithms stored in memory using transferred variable values to create images. A separate application program running on a personal computer allows a user to send command functions to the scene projector instructing it to, for example, be ready to receive a bit mapped image for display, prepare for firmware programming, start displaying RS-170 images, begin receiving object descriptor information to calculate and display synthetic image objects, etc. Selected functions are communicated to the DSP in a binary string of digits as a packet in a form as shown in Table 1:

TABLE 1

Command Function and Argument Communication Format

| Names of Binary Fields of Each Packet in sequence | Description |
| --- | --- |
| Byte Count | First 16 bits indicating the length in bits of the packet. |
| Command Op. Code | Next 8 bits defining the current function. |
| Data | Argument for Command op. code function having a variable length depending upon selected op. code function. |
| CRC | Fixed length of 32 bits allowing for cyclical redundancy checking. |
| Sequence | Unique 8 bit number identifying each transferred packet of information to allow for matching of acknowledgement responses from DSP. |

In the situation in which a command function calling for an object to be synthesized and displayed by the scene projector is transferred to the DSP, the data argument would consist of image creation parameters called "object descriptors." The PC application program includes a graphical user interface or "GUI" that allows for easy input of the object descriptors via predefined fields. These defined object descriptors are then grouped into the argument of the command function packet as part of the Data Field and transferred to the DSP CCA 36 via the serial RS-232 connection. The format and parameters of the object descriptor data portion is as shown in Table 2 below. The inventors envision a multitude of types and quantities of description elements, but 13 pre-defined parameters seem to satisfactorily describe most synthetic images. Since the type and operation of a graphical user interface is not essential for a complete understanding of the operation of the scene projector 10, and since combining a list of input object parameters into a binary data packet and transferring it to the memory of a computing device is well understood in the industry and may be accomplished in a variety of ways, further description of such interfaces will not be described. The essential capability of the remote user interface is that it be able to transfer binary files and bit mapped images via the RS-232 link, and that the creation of the object descriptors be created and transferred into memory elements 111 or 112. Object descriptors shown in Table 2 below are satisfactory for most synthetic images:

TABLE 2

A Suitable Object Descriptor Packet

| Descriptor Variable Name | Description |
| --- | --- |
| 1. X Offset | No. of array pixels in X (±) direction by which the object is offset from center of the emitter array. |
| 2. Y Offset | No. of array pixels in Y (±) direction by which the object is offset from center of the emitter array. |
| 3. X Sweep Rate | Rate at which the object is moved from right to left or left to right. Rate is based upon an internal clock frequency. |
| 4. Y Sweep Rate | Rate at which the object is moved from top to bottom or bottom to top. Rate is based upon an internal clock frequency. |
| 5. X Sweep Range | Limit or bounds of a sweeping range in X direction measured in no. of array pixels. |
| 6. Y Sweep Range | Limit or bounds of a sweeping range in Y direction measured in no. of array pixels. |
| 7. Rotation Angular Rate | Speed at which object rotates about center of array from vertical (as altered by X and Y Offsets) in radians/sec. |
| 8. Rotation Angle | Set angle in radians by which an object is to be rotated. |
| 9. Object Type | Selection of a predefined and preprogrammed object shape. |
| 10. Object Size | Size of object in no. of array pixels. |
| 11. Orbit Angular Rate | Rotation rate about center of array (as altered by X and Y Offsets) in radians/sec. |
| 12. Orbit Radius | Radius dimension from center of array (as altered by X and Y Offsets) in array pixels. |
| 13. Temp. Difference | Temperature of emitted object in Degrees Celsius above ambient temperature. |

Upon transmission of a command function packet calling for the creation of a defined image, the DSP 46 uses the received descriptors to set the initial conditions of the image and to set a rate timer that regulates the motion of the object, if any. The DSP then calculates the location of the object origin in terms of two dimensional Cartesian coordinates. After calculating the sweep position and orbit angle from the sweep rate and orbit angular rates respectively, the origin is computed utilizing the specified sweep position, sweep range, orbit angle, and orbit radius. Once the origin of the object is determined, the object is drawn in static memory 112 as a matrix representing individual pixel elements of the array 51.

Various predefined objects are preprogrammed into the DSP's memory 112 for execution upon receiving a recognized object type in the descriptor data (see parameter 9). The selected object type at the required size and specified delta temperature is then drawn using a combination of three basic drawing functions (not to be confused with operation command functions). The primary drawing functions and their associated arguments are a "plotline" ($x_0,y_0,x_1,y_1$, width), a "plot circle" (radius), and a "fill" (color). Each object is drawn using a combination of these primary drawing functions calculated by the DSP in association with other user supplied inputs from the scene projector's GUI. Each drawing function has an initial configuration and is scaled using the descriptor parameters to form the selected object. For example, a bar object might be invoked, a 4-bar object, a circle object, a triangle object, or an alignment object. Solid objects such as the triangle and circle are filled with a color that is based on a user inputted temperature differential. If rotation of an object is required then the rotation angle and rotation angular rate are provided in the object descriptor data, which are used to compute the next required image in a movement sequence. This is done using a polar coordinate system in which the coordinates of key features of the object are first computed and then the object is drawn in the same manner as in the original object position. After an object image is drawn by the DSP and saved in memory, the object image information is written to the infrared array. In the event that the drawn image moves beyond the 128×128 array pixel matrix bounds, the portion of the object still within the boundary of the pixel matrix is displayed. This display strategy allows for the replacement or upgrading of the 128×128 array to larger arrays such as 256 or 512 pixels without rewriting the DSP instructions. Below, a description of how each primary object is drawn by the DSP is given in terms of the primary drawing functions. Obviously, as new objects are added over time, new functions may also be created to efficiently draw each object.

The bar object is essentially a 7:1 aspect ratio bar constructed from the line and fill functions. Based on the user specified size described in terms of number of pixel elements, two horizontal lines are drawn and two connecting vertical lines having a length 7 times that of the bar width are inserted between their endpoints. The resulting rectangle is then filled with the fill level or "color" based on the received delta temperature parameter.

The 4-bar object is created using a four 7:1 aspect ratio bar equally spaced by an equidistant amount. The perimeter of the resulting pattern is a square which is then centered in the array and each bar is then constructed as with the single bar method, but with lines added and a fill color drawn.

The circle object uses the size specified by the operator in parameter No. 10 as the radius of a circle where the units of the radius is in number of pixel emitters of the array. The circle function is used to draw the circle object and then the fill function is applied.

A triangle is created using three line functions and applying the fill function. The size of the triangle is specified by the user and determines the distance in emitters from the center of the array to the vertices of an isosceles triangle.

Lastly, the alignment object is generated by combining four concentric circle functions and two orthogonal lines through the center point of the circles. The temperature level of the lines are based on the temperature delta selected by the operator.

While the above four objects have been developed using the described three primary drawing line functions, it will be understood that additional drawing functions and objects will likely be developed depending upon the evolution of testing applications and additional testing refinements.

While we have shown our invention in one form, it will be obvious to those skilled in the art that it is not so limited but is susceptible of various changes and modifications without departing from the spirit thereof.

Having set forth the nature of the present invention, what is claimed is:

1. An apparatus for displaying an infrared image, comprising:
    a. an infrared emitter array for converting electrical signals into an infrared image;
    b. an optical assembly for projecting said image upon a selected object;
    c. an electrical sub-assembly for generating timing and input-output control signals to said apparatus;
    d. a cooling element thermally connected to said emitter array for cooling said same;
    e. a processor assembly for generating image data utilized by said emitter array; and,
    f. wherein said emitter array, said optical assembly, said electrical sub-assembly, said cooling element, and said processor assembly are integrated within a single, self-contained module.

2. An apparatus as recited in claim 1, wherein said processor assembly includes means for generating synthetic images.

3. An apparatus as recited in claim 2, further including means for receiving externally created images for display by said apparatus.

4. An apparatus as recited in claim 3, wherein said receiving means includes means for receiving an RS-170 formatted signal.

5. An apparatus as recited in claim 3, wherein said means for generating synthetic images comprises a digital signal processor.

6. An apparatus as recited in claim 5, wherein said electrical sub-assembly comprises firmware control logic for administering element intensity in said emitter array and control logic for supplying timing and control signals for receiving video information.

7. An apparatus as recited in claim 1, further including means for receiving externally created images for display by said apparatus.

8. An apparatus as recited in claim 7, wherein said cooling element comprises a TEC type of cooling device.

9. An apparatus as recited in claim 7, wherein said electrical sub-assembly comprises firmware control logic for administering element intensity in said emitter array and control logic for supplying timing and control signals for receiving video information.

10. An apparatus as recited in claim 9, wherein said cooling element comprises a TEC type of cooling device mounted directly to said infrared emitter array.

11. An apparatus as recited in claim 1, wherein said cooling element comprises a TEC type of cooling device mounted to said infrared emitter array and wherein said apparatus further comprises a heat sink thermally connected to said emitter array.

12. An apparatus as recited in claim 11, wherein said means for generating synthetic images comprises a digital signal processor.

13. An apparatus as recited in claim 12, further including means for receiving externally created images for display by said apparatus.

14. An apparatus as recited in claim 1, wherein said optical assembly comprises a reflective collimator for reflecting said infrared image onto a selected object.

15. An apparatus as recited in claim 14, wherein said processor assembly includes means for mathematically generating images through algorithm processing.

16. An apparatus as recited in claim 15, further including means for receiving externally created images for display by said apparatus.

17. An apparatus for displaying an infrared image, comprising:
    a. means for emitting an infrared image;
    b. means for focusing said image upon a selected object;
    c. means for generating internal control and timing signals for said emitter means;
    d. means mounted to said emitting means for cooling said same;
    e. means for controlling said apparatus; and,
    f. wherein said apparatus is a single, self-contained module.

18. An apparatus as recited in claim 17, wherein said control means includes means for synthetically generating images.

19. An apparatus as recited in claim 18, further including means for receiving externally created images for display by said apparatus.

20. An apparatus as recited in claim 19, wherein said receiving means comprises means for receiving an RS-170 formatted signal.

21. An apparatus as recited in claim 19, wherein said control means comprises a microprocessor based assembly card.

22. An apparatus as recited in claim 21, wherein said means for generating internal control signals comprises a firmware array.

23. An apparatus as recited in claim 17, further including means for receiving externally created images for display by said apparatus.

24. An apparatus as recited in claim 23, wherein said cooling means comprises a TEC type of cooling device.

25. An apparatus as recited in claim 23, wherein said means for generating internal control signals comprises a firmware array.

26. An apparatus as recited in claim 25, wherein said cooling means comprises a TEC type of cooling device and said cooling means is mounted directly to said emitting means.

27. An apparatus as recited in claim 17, wherein said cooling means comprises a TEC type of cooling device and said cooling means is mounted directly to said emitting means.

28. An apparatus as recited in claim 27, wherein said control means comprises a digital signal processor based assembly card.

29. An apparatus as recited in claim 28, further including means for receiving externally created images for display by said apparatus.

30. An apparatus as recited in claim 17, wherein said focusing means comprises a reflective collimator for reflecting said infrared image upon a selected subject.

31. An apparatus as recited in claim 30, wherein said control means includes means for synthetically generating images through algorithm processing.

32. An apparatus as recited in claim 31, further including means for receiving externally created images for display by said apparatus.

33. An apparatus for displaying an infrared image, comprising:
   a. an infrared emitter array for converting electrical signals into an infrared image;
   b. an optical assembly for projecting said image upon a selected object;
   c. an electrical sub-assembly for generating electrical control signals received by said emitter array;
   d. a cooling element thermally connected to said emitter array for cooling said same; and,
   e. an embedded processor for generating image signals displayed by said emitter array.

34. An apparatus as recited in claim 33, wherein said processor includes programming instructions for synthetically generating images through algorithm processing.

35. An apparatus as recited in claim 34, further including means for receiving externally created images for display by said apparatus.

36. An apparatus as recited in claim 34, wherein said processor comprises a digital signal processor.

37. An apparatus as recited in claim 33, wherein said processor comprises a digital signal processor.

38. An apparatus as recited in claim 37, wherein said cooling element comprises a TEC type of cooling device.

39. An apparatus as recited in claim 33, wherein said optical assembly comprises a reflective collimator for reflecting said infrared image onto a selected object.

40. An apparatus as recited in claim 39, wherein said processor includes programming instructions for synthetically generating images through algorithm processing.

41. An apparatus as recited in claim 40, further including means for receiving externally created images for display by said apparatus.

42. A method for generating synthetic infrared images, comprising the steps of:
   a. receiving a command function from an external computing device to synthesize a predefined infrared object;
   b. receiving a set of object descriptor variables associated with said predefined infrared object;
   c. mapping one or more recorded primary drawing functions to said predefined infrared object;
   d. synthesizing said predefined object; and,
   e. projecting said synthesized object.

43. A method as recited in claim 42, wherein said step of synthesizing said predefined object comprises the steps of:
   a. executing said associated primary drawing functions;
   b. writing results of said drawing functions into a memory device;
   c. repeating steps a and b until said object is mathematically computed and saved; and,
   d. saving said mathematical results into a memory matrix modeling a pixel matrix of an infrared emitter array.

44. A method as recited in claim 43, wherein said step of projecting said synthesized object comprises the step of writing said mathematical results in said saved pixel matrix onto said emitter array to project said synthesized object.

45. A method as recited in claim 44, further including the step of interpreting said object descriptor variables to modify display of said predefined object in a predetermined manner to create an infrared scene.

46. A method as recited in claim 45, wherein said steps of synthesizing said predefined object and repeated iteratively to create a continuous display of preprogrammed infrared images in said scene.

47. A method as recited in claim 43, further including the step of interpreting said object descriptor variables to modify display of said predefined object in a predetermined manner to create an infrared scene.

48. A method as recited in claim 47, wherein said steps of synthesizing said predefined object and repeated iteratively to create a continuous display of preprogrammed infrared images in said scene.

* * * * *